Jan. 7, 1930. F. A. ANETSBERGER ET AL 1,742,842
HUMIDIFYING APPARATUS FOR PROOF BOXES AND THE LIKE
Filed June 28, 1928 2 Sheets-Sheet 1
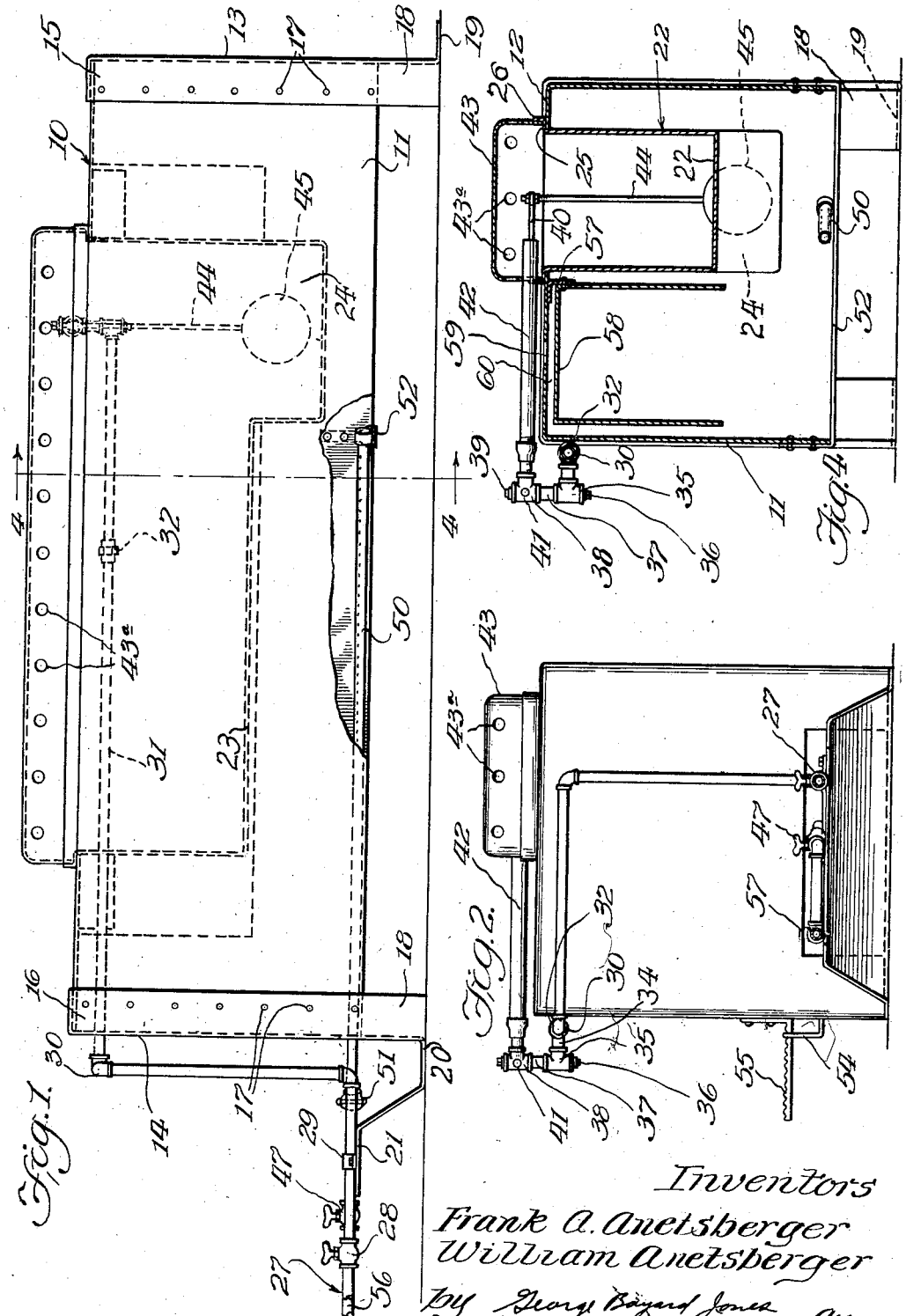
Inventors
Frank A. Anetsberger
William Anetsberger
By George Bayard Jones
Atty

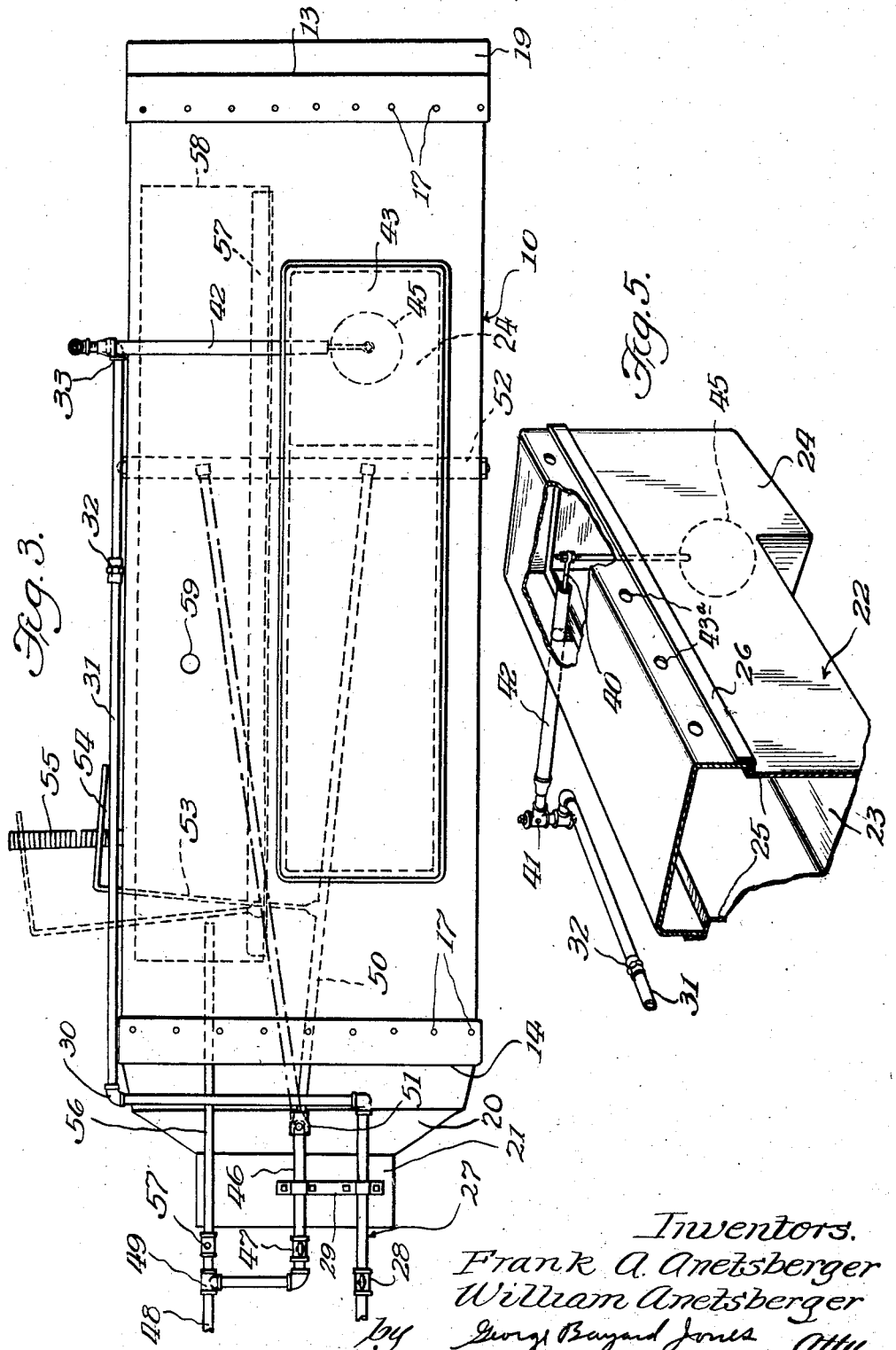

Patented Jan. 7, 1930

1,742,842

UNITED STATES PATENT OFFICE

FRANK A. ANETSBERGER AND WILLIAM ANETSBERGER, OF CHICAGO, ILLINOIS

HUMIDIFYING APPARATUS FOR PROOF BOXES AND THE LIKE

Application filed June 28, 1928. Serial No. 289,061.

This invention relates to improvements in humidifying apparatus for proof boxes or the like. The principal object of the invention is to provide a humidifying apparatus of improved construction having a water holding receptacle which can readily be removed from the apparatus for cleansing, renewal or repair.

Other objects of the invention relate to various features of construction and arrangement of parts which will be apparent from consideration of the following specification and accompanying drawings wherein:

Fig. 1 is a side elevation of a humidifying apparatus embodying the present invention.

Fig. 2 is a front elevation thereof.

Fig. 3 is a top plan view thereof.

Fig. 4 is a transverse sectional view taken on line 4—4 of Fig. 1.

Fig. 5 is a broken perspective view of a water holding receptacle and certain associated parts.

Proof boxes used by bakers for keeping the dough at proper humidity and temperature generally have a large number of shelves, the lower ones being spaced above the bottom of the box just sufficiently to accommodate a heating and humidifying apparatus.

After a period of use, in most localities, the water holding member, or steamer, becomes coated with a layer of water deposited material which lessens the efficiency of the apparatus and frequently causes the receptacles to burn out. Due to the fact that little space is provided between the lower shelf of the proof box and the bottom thereof, it has been very difficult heretofore to make any adjustment or change in the humidifier without disconnecting the water and gas pipes and removing the entire apparatus from the proof box. The proof box shelves are generally supported by angle irons which extend horizontally from the front to the rear of the box. By substituting angle brackets for the lower angle irons, sufficient space can be provided for freely removing the water holding receptacle from the present apparatus.

As shown in Fig. 1 the apparatus has an outer casing indicated generally by the numeral 10. The casing consists of vertical side walls 11 and horizontal top wall 12. The ends of the casing are closed by end members 13 and 14 which have flanges 15 and 16, respectively, which are riveted at 17 to the casing 10. The end members 13 and 14 preferably extend downwardly beyond the lower edges of the casing 10 to provide legs 18 for supporting the casing above the floor of the proof box. The end wall member 13 may be provided with a horizontal flange 19 forming a foot. The forward end wall 14 has a bottom extension 20 which is inclined upwardly and to the left, as shown in Fig. 1, and then horizontally to form the pipe support 21. The top wall 12 of casing 10 is provided with an opening which is offset from the longitudinal center thereof. A water holding receptacle 22 is adapted to be positioned in said opening, the receptacle being preferably made of sheet metal and having a substantially flat bottom 23 which is extended downwardly at one end to form a well portion 24. The upper edges of the receptacle are turned outwardly to form a perimetrical flange 25 which is turned upwardly to form the rim 26.

Flange 25 rests upon the edge of the top 12 around the opening therein as shown in Fig. 4. Water is supplied to the receptacle 22 through a suitable conduit indicated generally by a numeral 27 which is provided with a shut-off valve 28 adjacent the front end of the casing.

In the embodiment shown in the drawings, the pipe is secured to the pipe support 21 by a strap member 29 as shown in Fig. 3. The conduit extends to adjacent the end wall 14 then rises to a level near the top of the casing, and then passes transversely of the apparatus slightly beyond the side wall where it is connected by the elbow 30 to the pipe 31 which has interposed therein the adjustable connection for union 32. The end of the pipe 31 is connected by another elbow 33 to the short pipe 34 which in turn is connected to the T union 35 having a drain plug 36 at its lower outlet, the T 35 being connected by a short pipe 37 with the T 38 having a removable plug 39 at its upper end. The T 38 and pipe 37 have positioned therein a valve mechanism which is actuatable by an arm 40 which is pivoted at 41 in the T 38. The construction of the valve mechanism forms no part per se of the present improvements and need not be further described.

The operating arm 40 passes through the water discharge pipe 42 which is connected to the union 38 and passes through an opening in the flange of the cover 43 of the receptacle 22. Secured to the end of the arm 40 is a rod 44 which at its lower end carries the float 45 which is positioned in the well 24 of the water receptacle 22. When the valve 28 is open water flows into the receptacle 22 through the discharge pipe 42 and first fills the well 24 and overflows the same to cover the bottom 23 of the heating compartment of the receptacle. The float operated mechanism is adjustable to shut off the water when the same has risen to a predetermined level above the bottom 23, the inner diameter of the discharge pipe 42 being sufficient to accommodate the necessary vertical movement of the arm 40 upon its pivot 41.

Also secured to the pipe support 21 is the gas pipe 46 which is provided with a shut-off valve 47 and is connected to the supply pipe 48 by the T 49. The forward end of the pipe 46 supports the burner member 50, the latter of which has an enlarged end 51 which is pivoted to the pipe 46 to permit of horizontal adjustment of the burner. The forward end of the burner 50 rests on a transverse bar 52 which is secured to the casing 10. A handle 53 is secured to the burner 50 and extends beyond the casing 10 beneath the lower edge thereof, as shown in Fig. 3, and it has an angularly disposed portion 54 which bears against a notched retaining member 55 which may be riveted or otherwise secured to the adjacent side wall of the casing 10. It will thus be seen that the burner 53 can be moved from operative position beneath the bottom 23 of the receptacle 22 to the position shown by dot and dash lines. The burner can be adjusted in intermediate positions if desired thus producing a smaller amount of steam or vapor and more dry heat when conditions in the proof box so require.

Connected to the T 49 is a pilot 56 having a push valve 57 as shown in Fig. 3. By this construction the steam can be generated very rapidly and is permitted to escape through openings 43A in the cover 43 into the interior of the box. Secured to the lower side of the top wall 12 of the casing is an angle member 57 to one flange of which is secured a longitudinally disposed heat distributor or spreader 58 substantially of U shape in cross section. The distributor is spaced as shown in Fig. 4 from the adjacent side wall 11 and from the receptacle 22 and also from the top wall 12 which is provided with one or more outlet openings 59 as may be required. When the burner 50 has been moved to a position beneath the distributor 58 the receptacle 22 is protected to a large extent against the heat of the burner. The heated air can pass longitudinally around the open ends of the deflector 58 and through the space 60 to the outlet openings 59. It will thus be seen that a suitable circulation of heated air is effected, such circulation serving to uniformly heat up the casing and thus prevent excessive heat in the proof box at any particular position therein. When it is found desirable to remove the receptacle 22 the cover 43 which is held in position merely by the rim 26 can be removed and the discharge pipe 42 can be raised vertically, the elbow 30 permitting such movement, or it may be turned on a horizontal axis through the pipe 31 by virtue of the connection 32. This arrangement as will be seen permits the removal of the receptacle for cleaning the same of the accumulated deposits, for repair, or for renewal.

By this construction a baker may conveniently have an additional receptacle which may be placed in his apparatus without difficulty when desired. Although we have shown and described certain features to our improvements for the purpose of illustration it will be apparent that various changes may be made therein without departing from the spirit of the invention as defined in the appended claims.

What we claim is:

1. Humidifying apparatus comprising a casing having an opening in the top thereof, a water holding receptacle adapted to fit in said opening and having means for removably supporting the same therein, a heater in said casing beneath said receptacle, a pipe for supplying water to said receptacle through the top thereof, water level controlling means carried by said pipe, and a fitting to permit the free movement of the pipe and controlling means out of the path of said receptacle whereby the latter can be removed from said casing.

2. Humidifying apparatus comprising a casing having side, end, and top walls, and being open at the bottom, said top wall having an opening offset with reference to the longitudinal center line of the casing, a water holding receptacle removably supported in said opening by said top wall, a heat distributor in said casing between one side of said receptacle and a side wall of said casing, one of said end walls having an extension forming a pipe support, a gas pipe secured to said support, said pipe terminating outwardly of said end wall of said casing, a burner movably associated with the end of said pipe and being provided with a handle extending outwardly of the casing whereby the burner can be moved from operative position under said distributor to position under said receptacle, a water conduit exterior of said casing for supplying water to said receptacle, a water level control valve in said conduit, said valve having an operating arm extending through the delivery end of said conduit, a float secured to said arm and adapted to be positioned in said receptacle when said conduit is in operative position, and a fitting for said conduit whereby the latter and said arm and float can be moved freely as a unit to permit the removal of said receptacle from said casing.

3. Humidifying apparatus comprising a casing having a top wall provided with an opening, a water receptacle having a body adapted to slide vertically through said opening, said receptacle having an upper perimetric flange adapted to rest on the edge of said casing around said opening for holding said receptacle in depending position within said casing, said flange having an upturned rim, a cover for said receptacle adapted to rest on said flange and to be removably confined thereon by said rim, means in said casing for supplying heat to said receptacle, a movable conduit for supplying water to said receptacle through an opening in said cover, and means comprising a float operated valve for controlling the level of the water in said receptacle, said means being carried by said conduit.

4. Humidifying apparatus comprising a casing open at the bottom and having side, end, and top walls, said top wall having an opening therein, a water holding receptacle in said opening, said receptacle having a perimetric flange at its top adapted to rest on the top of said casing around the opening for holding said receptacle in depending position within said casing, said flange having a rim, a cover for said receptacle having a downwardly extending flange removably secured in position by said rim, a burner in said casing, said burner being movable from a position under said receptacle to a position removed therefrom, a heat distributor in said casing spaced from the walls thereof for distributing heated air toward the ends of the casing when the burner is in the last named position, a water conduit comprising a discharge pipe overlying the top wall of the casing and extending through an opening in the flange of said cover for supplying water to said receptacle, a valve in said conduit having an operating arm passing through said discharge pipe, a float in said receptacle operatively attached to said arm for actuating said valve to regulate the level of water in said receptacle, and a fitting for said conduit to permit said discharge pipe to be moved away from the receptacle whereby the latter can be lifted from said casing.

In testimony whereof, we have subscribed our names.

FRANK A. ANETSBERGER.
WILLIAM ANETSBERGER.